United States Patent
Takahashi

[11] 4,018,511
[45] Apr. 19, 1977

[54] PHOTOGRAPHIC WIDE ANGLE LENS
[75] Inventor: Yasuo Takahashi, Tokyo, Japan
[73] Assignee: Asahi Kogaku Kogyo Kabushiki Kaisha, Tokyo, Japan
[22] Filed: Nov. 17, 1975
[21] Appl. No.: 632,595
[30] Foreign Application Priority Data
Nov. 18, 1974   Japan .............................. 49-132506
[52] U.S. Cl. ................................................ 350/214
[51] Int. Cl.² ........................................... G02B 13/04
[58] Field of Search .................................... 350/214

[56] References Cited
UNITED STATES PATENTS
3,622,227  11/1971  Shimizu .............................. 350/214
3,870,402  3/1975  Takahashi ........................... 350/214

Primary Examiner—John K. Corbin
Assistant Examiner—Conrad Clark
Attorney, Agent, or Firm—Sughrue, Rothwell, Mion, Zinn & Macpeak

[57] ABSTRACT
A wide angle lens which is designed to achieve miniaturization without sacrificing optical quality is disclosed.

1 Claim, 2 Drawing Figures

PHOTOGRAPHIC WIDE ANGLE LENS

BACKGROUND OF THE INVENTION

With the development of wide angle lenses, it is natural that lightweight wide angle lenses would be desirable to permit further miniaturization thereof. It is also desirable that such lightweight lenses do not sacrifice efficiency. The wide angle lens according to the present invention is lightweight and has good efficiency.

SUMMARY OF THE INVENTION

A retro-focus type wide angle lens consisting of seven lenses which are divided into a first group and a second group, said first group consisting of a first negative meniscus lens convex to the object a second positive lens, and a third negative meniscus lens convex to the object said second group comprising a fourth positive lens, a fifth negative lens, a sixth positive meniscus lens, and a seventh positive lens, said lenses and the spacings therebetween satisfying the following conditions:

(1) $\frac{F}{0.3} < F_{1,2} < \frac{F}{0.05}$ (2) $\frac{F}{1.2} < |F_{1,2,3}| < \frac{F}{0.9} \quad F_{1,2,3} < 0$ (3) $\frac{F}{0.85} < F_{1,2,3,4} < \frac{F}{0.5}$ (4) $0.5F < r_7 < 0.9F$ (5) $0.4F < d_1 + d_2 + d_3 + d_4 + d_5 + d_6 < 0.8F$ (6) $F < r_{10} < 2F$ (7) $0.4F < d_7 + d_8 + d_9 < 0.8F$, where;

F is the combined focal length of the seven lenses;
$F_{1,2...i}$ is the combined focal length of lenses 1 thru $i$;
$n_i$ is the refractive index in $d$-line of the $i$th lens;
$\nu_i$ is Abbe's number for the $i$th lens;
$d_j$ is distance along the optical axis between the $j$ surface and the ($j+1$) surface of the lenses; and
$r_k$ is the radius of curvature of the $k$ surface of the lenses.

DETAILED DESCRIPTION OF THE INVENTION

Figure 1:
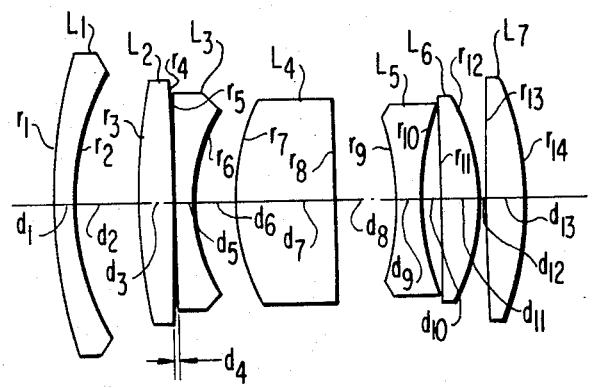
FIG. 1 illustrates a lens structure.
Figure 2:
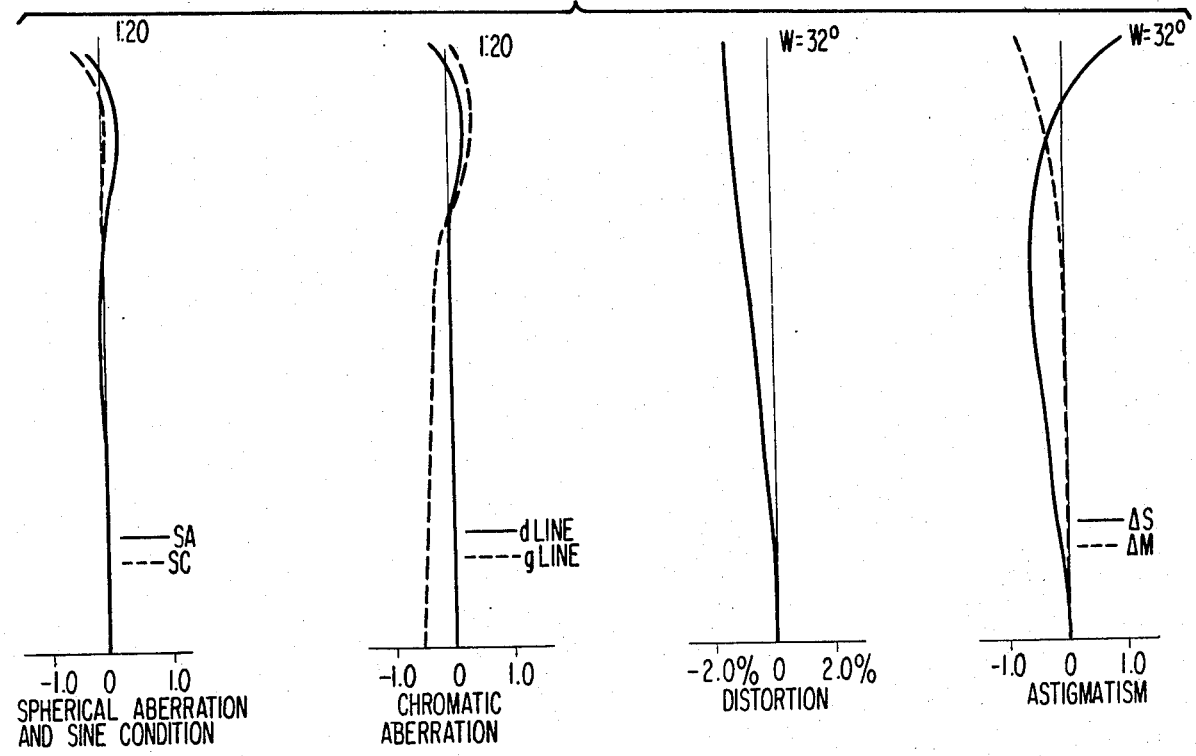
FIG. 2 illustrates curves of aberrations in a preferred embodiment.

Referring to FIG. 1, there is shown a wide angle lens according to the present invention comprising first and second groups of lenses. The first group includes, in combination, a first negative meniscus lens $L_1$ convex to the object a second positive lens $L_2$, and a third negative meniscus lens $L_3$ convex to the object. The second group comprises a fourth positive lens $L_6$, a fifth negative lens $L_5$, a sixth positive meniscus lens 6, and a seventh positive lens $L_7$. The second group is opposed to the first group. The lens satisfies the following conditions of focal length, radius of curvature, distance and thickness, refractive index, and Abbe's number:

(1) $\frac{F}{0.3} < F_{1,2} < \frac{F}{0.05}$

-continued (2) $\frac{F}{1.2} < |F_{1,2,3}| < \frac{F}{0.9} \quad F_{1,2,3} < 0$ (3) $\frac{F}{0.85} < F_{1,2,3,4} < \frac{F}{0.5}$ (4) $0.5F < r_7 < 0.9F$ (5) $0.4F < d_1 + d_2 + d_3 + d_4 + d_5 + d_6 < 0.8F$ (6) $F < r_{10} < 2F$
(7) $0.4F < d_7 + d_8 + d_9 < 0.8F$, where;

F is the combined focal length of the system;
$F_{1,2...i}$ is the combined focal length of lenses 1 through $i$;
$n_i$ is the refractive index in $d$-line of the $i$ lens (as is well known the $d$-line is a special absorption spectral line for Na having a wave length of about 5890 A — also known as Fraunhofer's $d$-line);
$\nu_i$ is Abbe's number of the $i$ lens;
$d_j$ is the thickness or distance between the $j$th and the $j+1$ surfaces along the axis as shown in FIG. 1; and
$r_k$ is the radius of curvature of the $k$ surface.

Explanation of Condition (1)

Condition (1) is established to determine the focal length up to the second lens, the purpose of which is mainly to correct distortion aberration. It is natural that the condition is connected with $F_1$, but $F_{1,2}$ must be set to maintain a general chromatic aberration in a good condition. However, if $F_{1,2}$ is longer than $F/0.05$, the effect of correcting distortion aberration lessens and the purpose of using a positive lens as the second lens tends to vanish. It is further natural that where $F_1$ is extremely negative and has a short focal length, the balance of correction to $F_{1,2}$ is improperly lost. Furthermore, where $F_{1,2}$ is less than $F/0.3$ and becomes short, there occurs the disadvantage that it is not only convenient to make the backfocus longer, but also the latter group of lenses is quiet forcibly worked in order to accomplish the object, resulting in a likely loss of balance in aberration.

Explanation of Condition (2)

Condition (2) is established to determine the distribution of the negative focal length up to the third lens. Where $F_{1,2,3}$ is negative and longer than $F/0.9$, it is disadvantageous in terms of backfocus, and where other methods are used to compensate for the backfocus, the burden of the positive lens increases in the second group, and that is not desirable. This is not proper because it causes trouble in attempts toward miniaturization. Where $F_{1,2,3}$ is less than $F/1.2$ and becomes short, it is advantageous for the backfocus but the burden in the negative degree on the part of $r_2$, $r_6$, etc. increases and as a result, coma aberration is relatively high. The provision of the focal length in the range as described is important to control the amount of spherical aberration and is also necessary to reduce the number of lenses (this relating to Condition (4) later described).

Explanation of Condition (3)

This condition is established to determine the focal length to the first group divided by means of an aperture. With this condition, the focal length of the fifth lens is controlled, and therefore, the condition has important factors related also to the sixth and seventh lenses. Where $F_{1.2.3.4}$ has a focal length longer the F/0.5, it is difficult to correct the chromatic aberration after the fifth lens and thus the focal length to the fifth lens is negative and tends to become short, and as a consequence, the burden imposed on the sixth and seventh lenses increases. From this, in correction of aberration, lenses of high refractive index tend to be used but from a viewpoint of chromatic aberration, it is desirable to use those of small dispersion, with the result that actually existing potassium nitrate is hard to be selected, resulting in a difficulty of aberration correction. Further, where $F_{1.2.3.4}$ is shorter than F/0.85, the backfocus is likely shortened, and if this is compensated for by shortening the negative focal length of the fifth lens, the radius of curvature in opposite surfaces of the fifth lens is unavoidably shortened, resulting in a likely occurrence of coma aberration. If this is compensated for by the spacing after the fifth lens, the burden of the sixth and seventh lenses increases, which is not desirable.

Explanation of Condition (4)

This condition is established to reduce the amount of spherical aberration in large aperture. This condition is easily influenced particularly by the condition (2) and $d_6$. Accordingly, the determination of the radius of curvature greatly influences the amount of aberration. This is because of excessive exertion of the influence of aberration in a higher order. Where $r_7$ is shorter than 0.5F, action thereof in a higher order with respect to the aberration becomes too great so that even if suitable correction should be made in a region of a zonal ray, the marginal ray would create the spherical aberration in a direction of excessively under correction. Conversely, where $r_7$ is greater than 0.9F, action is too short so that over correction excessively remains.

Explanation of Condition (5)

Although intimately related to the conditions (2) and (4) as previously described, this condition (5) is established for the purpose of determining the range of miniaturization and of selecting the range so as not to worsen the aberration. This condition is also related to the thickness of lens and spacing, but it is natural that $d_6$ must have a suitable value in order to maintain the backfocus for a long period of time as necessary. It is preferred, however, that the value in variation of $d_6$ and the value in variation of the sum from $d_1$ to $d_5$ are summed up and the quantity of light may suitably be adjusted under the condition (5). Where the value of $d_1 + d_2 + d_3 + d_4 + d_5 + d_6$ is smaller than 0.4F, the object of miniaturization may be attained but a decrease in the quantity of light or an aggravation in coma aberration with respect to a beam of light lower in incidence tends to occur, which is not desirable. Where the aforesaid value is greater than 0.8F, it may be advantageous in terms of aberration correction, but opposed to the object of miniaturization since the front lens will likely increase its diameter.

Explanation of Condition (6)

This condition is established to prevent coma aberration from being worsened. In the present optical system, it is advantageous to employ the fifth lens, which is small in the $\nu$ value, relative to the chromatic aberration correction in the latter group, and hence, the necessity of using potassium nitrate in refractive index occurs. For this reason, the condition (6) is required since the refractive power here tends to result in the disturbance of the image in the form of a beam of light relatively lower in incidence. That is, where $r_{10}$ is smaller than F, the above-described beam of light likely becomes an outward coma, whereas where it is longer than 2F, the beam of light likely becomes an inward coma.

Explanation of Condition (7)

This condition has an intimate relation with the condition (6) and is established to properly maintain the balance between the seventh surface and the tenth surface and is also related to the object of achieving miniaturization. Where the value of $d_7 + d_8 + d_9$ is greater than 0.8F, and if the fourth lens and the fifth lens (including $r_{10}$) sufficiently perform their function so as to maintain the balance of aberration, both the lenses in the former and latter groups are unavoidably designed greater in size, which is opposed to the object of miniaturization. Where the aforesaid value is smaller than 0.4F, the action of the fourth and fifth lenses becomes dull, and particularly, action of the seventh surface and the tenth surface is not progressed as desired to thereby lose the balance of aberration. Particularly in the case of brightness at the ratio of about 1:2, this effect is notable.

One example is as shown in the following:

EXAMPLE

F = 100
$F_{1.2}$ = 653.59
$F_{1.2.3}$ = −96.15
$F_{1.2.3.4}$ = 141.84
For reference: The sum of Petzval: 0.198

| Lens | Radius of Curvature r | | Lens Thickness or Distance d | | Refractive Index n | Abbe No. $\nu$ |
|---|---|---|---|---|---|---|
| $L_1$ | $r_1$ = | 161.15 | $d_1$ = | 6.15 | $n_1$ = 1.60738 | $\nu_1$ = 56.8 |
| | $r_2$ = | 72.55 | $d_2$ = | 19.93 | | |
| $L_2$ | $r_3$ = | 186.64 | $d_3$ = | 10.50 | $n_2$ = 1.71300 | $\nu_2$ = 53.9 |
| | $r_4$ = | −402.24 | $d_4$ = | 0.59 | | |
| $L_3$ | $r_5$ = | 1834.76 | $d_5$ = | 6.41 | $n_3$ = 1.56873 | $\nu_3$ = 63.1 |
| | $r_6$ = | 49.54 | $d_6$ = | 14.12 | | |
| $L_4$ | $r_7$ = | 65.07 | $d_7$ = | 30.23 | $n_4$ = 1.79952 | $\nu_4$ = 42.2 |

-continued

| Lens | Radius of Curvature r | Lens Thickness or Distance d | Refractive Index n | Abbe No. ν |
|---|---|---|---|---|
| | $r_8 = -362.02$ | | | |
| | | $d_8 = 10.91$ | | |
| $L_5$ | $r_9 = -69.86$ | | | |
| | | $d_9 = 7.23$ | $n_5 = 1.80518$ | $\nu_5 = 25.4$ |
| | $r_{10} = 152.00$ | | | |
| | | $d_{10} = 6.69$ | | |
| $L_6$ | $r_{11} = -235.10$ | | | |
| | | $d_{11} = 11.40$ | $n_6 = 1.73400$ | $\nu_6 = 51.5$ |
| | $r_{12} = -60.16$ | | | |
| | | $d_{12} = 2.00$ | | |
| $L_7$ | $r_{13} = 381.07$ | | | |
| | | $d_{13} = 12.45$ | $n_7 = 1.64000$ | $\nu_7 = 60.2$ |
| | $r_{14} = -105.28$ | | | |

All linear dimensions given above are in millimeters.

What is claimed is:

1. A retro-focus type wide angle lens system composed of seven lenses in two groups, the first group consisting of a first negative meniscus lens $L_1$ convex to the object, a second positive lens $L_2$, and a third negative meniscus lens $L_3$ convex to the object, and the second group consisting of a fourth positive lens $L_4$, a fifth negative lens $L_5$, a sixth positive meniscus lens $L_6$, and a seventh positive lens $L_7$, wherein the focal lengths, the radii of curvature $r_1$ to $r_{14}$, the lens thickness or distance $d_1$ to $d_{13}$, the refractive indices $n_1$ to $n_7$, and the Abbe numbers $\nu_1$ to $\nu_7$ for the lenses $L_1$ to $L_7$ satisfy the following conditions:

$F = 100$, where F is the focal length of the whole system, $F_{1.2} = 653.59$, where $F_{1.2}$ is the combined focal length of lenses $L_1$ and $L_2$, $F_{1.2.3} = -96.15$, where $F_{1.2.3}$ is the combined focal length of lenses $L_1$ through $L_3$, and $F_{1.2.3.4} = 141.84$, where $F_{1.2.3.4}$ is the combined focal length of lenses $L_1$–$L_4$

| Lens | Radius of Curvature r | Lens Thickness or Distance d | Refractive Index n | Abbe No. ν |
|---|---|---|---|---|
| $L_1$ | $r_1 = 161.15$ | | | |
| | | $d_1 = 6.15$ | $n_1 = 1.60738$ | $\nu_1 = 56.8$ |
| | $r_2 = 72.55$ | | | |
| | | $d_2 = 19.93$ | | |
| $L_2$ | $r_3 = 186.64$ | | | |
| | | $d_3 = 10.50$ | $n_2 = 1.71300$ | $\nu_2 = 53.9$ |
| | $r_4 = -402.24$ | | | |
| | | $d_4 = 0.59$ | | |
| $L_3$ | $r_5 = 1834.76$ | | | |
| | | $d_5 = 6.41$ | $n_3 = 1.56873$ | $\nu_3 = 63.1$ |
| | $r_6 = 49.54$ | | | |
| | | $d_6 = 14.12$ | | |
| $L_4$ | $r_7 = 65.07$ | | | |
| | | $d_7 = 30.23$ | $n_4 = 1.79952$ | $\nu_4 = 42.2$ |
| | $r_8 = -362.02$ | | | |
| | | $d_8 = 10.91$ | | |
| $L_5$ | $r_9 = -69.86$ | | | |
| | | $d_9 = 7.23$ | $n_5 = 1.80518$ | $\nu_5 = 25.4$ |
| | $r_{10} = 152.00$ | | | |
| | | $d_{10} = 6.69$ | | |
| $L_6$ | $r_{11} = -235.10$ | | | |
| | | $d_{11} = 11.40$ | $n_6 = 1.73400$ | $\nu_6 = 51.5$ |
| | $r_{12} = -60.16$ | | | |
| | | $d_{12} = 2.00$ | | |
| $L_7$ | $r_{13} = 381.07$ | | | |
| | | $d_{13} = 12.45$ | $n_7 = 1.64000$ | $\nu_7 = 60.2$ |
| | $r_{14} = -105.28$ | | | |

* * * * *